(12) United States Patent
Cao et al.

(10) Patent No.: US 11,175,569 B2
(45) Date of Patent: *Nov. 16, 2021

(54) GIMBAL CONTROL

(71) Applicant: SZ DJI OSMO TECHNOLOGY CO., LTD., Shenzhen (CN)

(72) Inventors: Zisheng Cao, Shenzhen (CN); Bingzhen Yang, Shenzhen (CN); Lifu Yu, Shenzhen (CN); Yan Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,068

(22) Filed: May 14, 2020

(65) Prior Publication Data
US 2020/0272033 A1     Aug. 27, 2020

Related U.S. Application Data

(63) Continuation of application No. 16/274,551, filed on Feb. 13, 2019, now Pat. No. 10,656,503, which is a continuation of application No. PCT/CN2016/095775, filed on Aug. 17, 2016.

(51) Int. Cl.
| | |
|---|---|
| *G03B 17/56* | (2021.01) |
| *G05D 3/00* | (2006.01) |
| *H04N 5/232* | (2006.01) |
| *F16M 11/12* | (2006.01) |

(52) U.S. Cl.
CPC .......... *G03B 17/561* (2013.01); *F16M 11/123* (2013.01); *G05D 3/00* (2013.01); *H04N 5/2328* (2013.01); *H04N 5/23212* (2013.01); *H04N 5/23216* (2013.01); *H04N 5/23267* (2013.01); *H04N 5/23296* (2013.01)

(58) Field of Classification Search
None
See application file for complete search history.

(56) References Cited

U.S. PATENT DOCUMENTS

| | | | |
|---|---|---|---|
| 10,419,681 | B2 | 9/2019 | Jones |
| 10,656,503 | B2 * | 5/2020 | Cao ............... H04N 5/2328 |
| 2002/0171742 | A1 | 11/2002 | Ito et al. |
| 2011/0157394 | A1 | 6/2011 | Yoshizumi |
| 2015/0264236 | A1 | 9/2015 | Okada et al. |

(Continued)

FOREIGN PATENT DOCUMENTS

| | | |
|---|---|---|
| CN | 101833340 A | 9/2010 |
| CN | 103713652 A | 4/2014 |

(Continued)

OTHER PUBLICATIONS

World Intellectual Property Organization (WIPO) International Search Report for PCT/CN2016/095775 dated May 19, 2017 6 Pages.

*Primary Examiner* — William B Perkey
(74) *Attorney, Agent, or Firm* — Anova Law Group, PLLC

(57) ABSTRACT

A method for controlling a gimbal includes obtaining a current angle of view of a photographing device provided on the gimbal, determining, according to the current angle of view, an adjustment strategy for adjusting the gimbal that allows the photographing device to output stable images, and adjusting at least one of an acceleration or a sensitivity of the gimbal according to the adjustment strategy.

20 Claims, 4 Drawing Sheets

(56) References Cited

U.S. PATENT DOCUMENTS

| | | | |
|---|---|---|---|
| 2016/0028956 A1 | 1/2016 | Webb et al. | |
| 2017/0155832 A1 | 6/2017 | Oshima et al. | |
| 2018/0007282 A1 | 1/2018 | Sato et al. | |
| 2018/0115795 A1* | 4/2018 | Chinnaiyan | H04N 21/2662 |
| 2018/0124326 A1 | 5/2018 | Irie et al. | |
| 2018/0335684 A1 | 11/2018 | Strauser | |
| 2020/0130861 A1* | 4/2020 | Wu | F16M 11/18 |

FOREIGN PATENT DOCUMENTS

| | | |
|---|---|---|
| CN | 104822019 A | 8/2015 |
| CN | 204925807 U | 12/2015 |
| CN | 105283816 A | 1/2016 |
| CN | 205071161 U | 3/2016 |
| KR | 101236994 B1 | 2/2013 |

\* cited by examiner

GIMBAL CONTROL

CROSS-REFERENCE TO RELATED APPLICATIONS

This application is a continuation of application Ser. No. 16/274,551, filed on Feb. 13, 2019, which is a continuation of International Application No. PCT/CN2016/095775, filed on Aug. 17, 2016, the entire contents of both of which are incorporated herein by reference.

TECHNICAL FIELD

The present disclosure relates to gimbal control technology and, more particularly, to a gimbal control method and apparatus, a storage medium, and an unmanned vehicle.

BACKGROUND

A gimbal is a support apparatus that holds and stabilizes a camera, and can be a mechanical or an electrical gimbal. A mechanical gimbal is suitable for a small range of surveillance, and an electrical gimbal provides a wide range of scanning surveillance. When the camera is moving, the electrical gimbal receives the signal from a controller that controls the precise movement of the electrical gimbal, such that the camera can be stabilized to output clear images.

In conventional technologies, the gimbal control system and the camera control system are two independent control systems, such that the gimbal and the camera need to be controlled separately. When the focal length of the camera changes, if the gimbal control system utilizes a set of fixed control method, for example, a fixed speed control, a fixed acceleration control, a fixed dead-zone control, or the like, the movement control of the gimbal is either too fast or too slow relative to the focal length of the camera. As such, a stable image output from the camera is affected, which is harmful for the collection and monitoring of data information.

SUMMARY

In accordance with the disclosure, there is provided a method for controlling a gimbal including obtaining a current angle of view of a photographing device provided on the gimbal, determining, according to the current angle of view, an adjustment strategy for adjusting the gimbal that allows the photographing device to output stable images, and adjusting the gimbal according to the adjustment strategy.

Also in accordance with the disclosure, there is provided an apparatus for controlling a gimbal including a data collector and a data processor coupled to the data collector. The data collector is configured to obtain a current angle of view of a photographing device provided on the gimbal. The data processor is configured to determine, according to the current angle of view, an adjustment strategy for adjusting the gimbal that allows the photographing device to output stable images, and adjust the gimbal according to the adjustment strategy.

DETAILED DESCRIPTION OF THE EMBODIMENTS

Exemplary embodiments will be described with reference to the accompanying drawings. In the situation where the technical solutions described in the embodiments are not conflicting, they can be combined.

Figure 1:
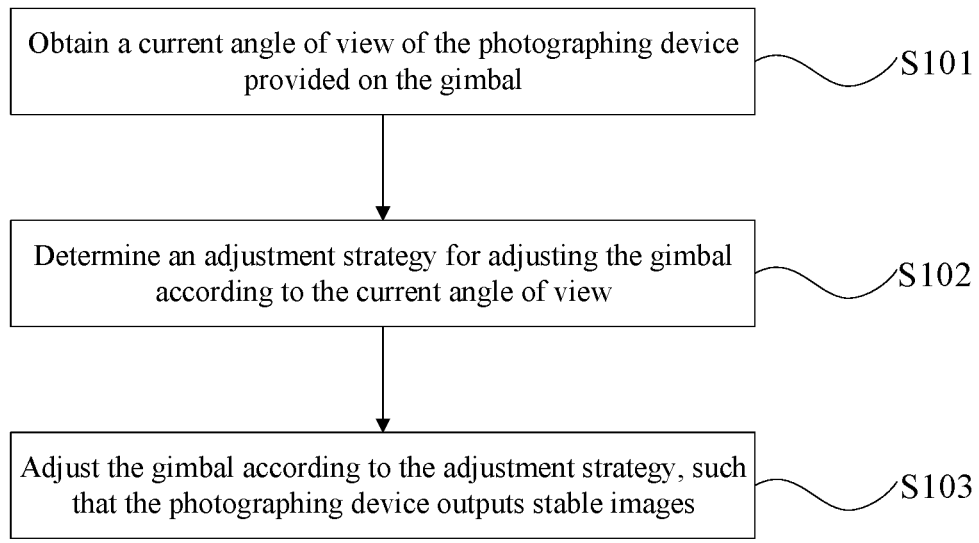
FIG. 1 is a schematic flow chart of a gimbal control method according to an embodiment of the disclosure.

FIG. 1 is a schematic flow chart of an exemplary gimbal control method consistent with the disclosure. The control method is configured to control the gimbal and a photographing device provided on the gimbal.

As shown in FIG. 1, at S101, a current angle of view of the photographing device provided on the gimbal is obtained.

The photographing device, for example, a camera, is carried by the gimbal. The current angle of view refers to an angle range that a lens of the photographing device can image at the moment. The current angle of view can be also referred to as a current field of view (FOV). It is not intended to limit the method for obtaining the current angle of view. Those skilled in the art can configure a method according to a specific design requirement, as long as the current angle of view can be obtained. The detailed description thereof is omitted here.

At S102, an adjustment strategy for adjusting the gimbal is determined according to the current angle of view.

In some embodiments, the current angle of view can be analyzed and compared with a preset standard angle of view, and a corresponding adjustment strategy can be determined according to a comparison result. In some other embodiments, a preset list of the standard angles of view can be looked up to check whether there is a standard angle of view that matches the current angle of view. The list of the standard angles of view can store a corresponding relationship between the standard angles of view and adjustment strategies. If the standard angle of view that matches the current angle of view is found in the list of the standard angles of view, the adjustment strategy corresponding to the standard angle of view can be determined as the adjustment strategy of the current angle of view. Those skilled in the art can also utilize other manners of determining the adjustment strategy according to the current angle of view, as long as the adjustment strategy for adjusting the gimbal can be determined accurately and effectively. The detailed description thereof is omitted here.

At S103, the gimbal is adjusted according to the adjustment strategy, such that the photographing device outputs stable images.

The adjustment strategy can include one or more adjusting parameters and/or one or more adjusting instructions.

The one or more adjustment parameters can include a target speed, a target rotation speed, a target rotation angle, a target sensitivity, or the like, for adjusting the gimbal. The adjustment instructions can be set according to a specific design requirement, as long as the photographing device provided on the gimbal can output stable images after the gimbal is adjusted according to the adjustment strategy. The detailed description thereof is omitted here.

In the embodiment, the current angle of view of the photographing device can be obtained, the adjustment strategy for adjusting the gimbal can be determined according to the current angle of view, and the gimbal can be adjusted according to the adjustment strategy. As such, the stable image output of the photographing device can be effectively ensured. Therefore, the problem that the stable image output of the photographing device can be affected, which is harmful for the collection and monitoring of data information, can be overcome. At the same time, the accuracy of the image captured by the photographing device can be ensured, thereby improving the practicability of the gimbal control method and promoting the market promotion and application.

Figure 2:
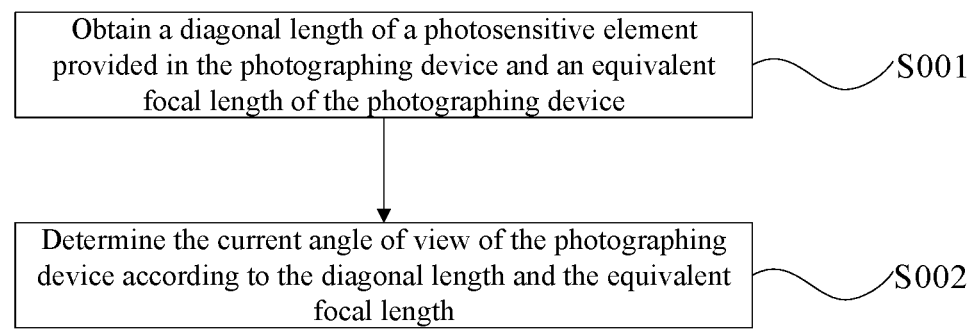
FIG. 2 is a schematic flow chart of another gimbal control method according to an embodiment of the disclosure.

FIG. 2 is a schematic flow chart of another exemplary gimbal control method consistent with the disclosure. As shown in FIG. 2, before obtaining the current angle of view of the photographing device provided on the gimbal, the gimbal control method also includes, at S001, a diagonal length of a photosensitive device provided in the photographing device and an equivalent focal length of the photographing device are obtained.

The photosensitive device can be a charge-coupled device (CCD) or a complementary metal-oxide-semiconductor (CMOS). Generally, the photosensitive device has a rectangular structure and the diagonal length is greater than a length and a width of the photosensitive device. In order to avoid the occurrence of dark-corners in images captured by the photographing device, the actual angle of view of the photographing device can be smaller than the calculated current angle of view. In some embodiments, the diagonal length can be obtained through direct measurement. In some other embodiments, the length and the width of the rectangular structure can be obtained and the diagonal length can be determined according to the length and the width. Those skilled in the art can also utilize other manners to obtain the diagonal length. The detailed description thereof is omitted here. In some embodiments, the equivalent focal length of the photographing device can be obtained through a user input. In some embodiments, the equivalent focal length of the photographing device can be obtained from a corresponding factory standard document. In some other embodiments, a height of the lens of the photographing device and a zoom factor of the photographing device can be obtained, and the equivalent focal length of the photographing device can be determined by a product of the height of lens and the zoom factor. Those skilled in the art can also utilize other manners to obtain the equivalent focal length, as long as the equivalent focal length of the photographing device can be accurately obtained. The detailed description thereof is omitted here.

At S002, the current angle of view of the photographing device is determined according to the diagonal length and the equivalent focal length.

In some embodiments, determining the current angle of view of the photographing device according to the diagonal length and the equivalent focal length, includes the process at S0021.

At S0021, the current angle of view of the photographing device is determined according to a formula $$\tan(w) = \frac{y'}{2f'},$$

where y' denotes the diagonal length of the photosensitive device provided in the photographing device, f' denotes the equivalent focal length of the photographing device, w denotes the current angle of view of the photographing device.

It is not intended to limit the manner of determining the current angle of view of the photographing device according to the diagonal length and the equivalent focal length. Those skilled in the art can utilize other manners according to a specific design requirement. The detailed description thereof is omitted here.

In the embodiment, the current angle of view can be accurately and effectively obtained using the above formula to compute the diagonal length and the equivalent focal length. The accuracy and reliability of the current angle of view can be effectively ensured, thereby improving the accuracy and reliability of controlling the gimbal according to the gimbal control method, and promoting the market promotion and application.

Figure 3:
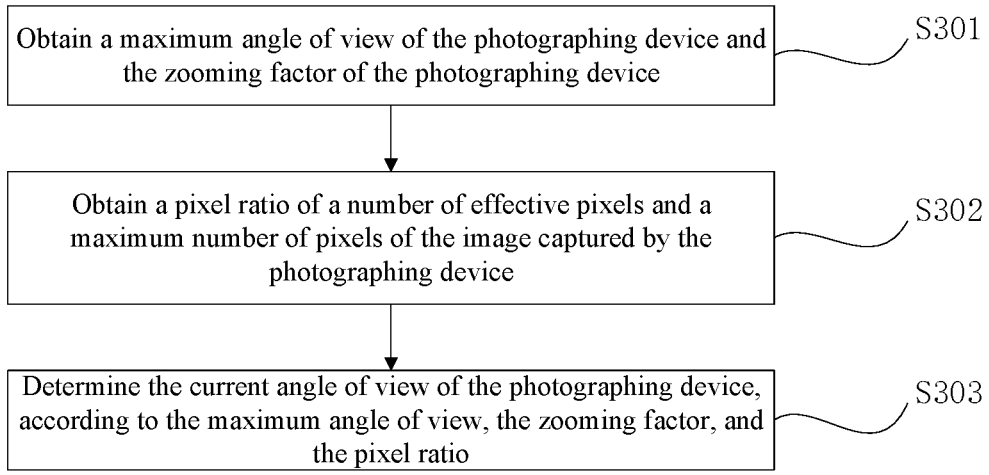
FIG. 3 is a schematic flow chart of another gimbal control method according to an embodiment of the disclosure.

FIG. 3 is a schematic flow chart of another exemplary gimbal control method consistent with the disclosure. As shown in FIG. 3, obtaining the current angle of view of the photographing device provided on the gimbal includes the following processes.

At S301, a maximum angle of view of the photographing device and the zooming factor of the photographing device are obtained.

The maximum angle of view refers to the angle of view having a maximum value among a plurality of angles of view of the photographing device, for example, a zooming photographing device, during a zooming process. The angles of view correspond to the focal lengths of the photographing device. The method for obtaining the maximum angle of view can be similar to the method for obtaining the current angle of view described above. In some embodiments, the maximum angle of view can be directly obtained from a factory design file of the photographing device. The zooming factor can be also obtained from the factory design file of the photographing device. Those skilled in the art can also utilize other manners to obtain the zooming factor of the photographing device, as long as the zooming factor of the photographing device can be accurately obtained. The detailed description thereof is omitted here.

At S302, a pixel ratio of a number of effective pixels and a maximum number of pixels of the image captured by the photographing device can be obtained, when a resolution of the photosensitive device of the photographing device is determined.

The resolution of the photosensitive device is configured to measure an amount of data in a bitmap image. If the resolution of the photosensitive device is determined, it indicates that the amount of data in the image captured by the photographing device is constant, and the pixel ratio of the number of effective pixels and the maximum number of pixels in the image can be obtained. The number of effective pixels refers to the number of pixels that participate in a photosensitive imaging process. The maximum number of pixels refers to all of the pixels of the photosensitive device. That is, the maximum number of pixels can refer to all of the pixels of the CCD or CMOS, or the resolution of the CCD or CMOS. In some embodiments, the number of effective pixels can be obtained through image scanning and analysis, and the maximum number of pixels can be obtained from a standard design document of the photosensitive device. Therefore, the pixel ratio of the number of effective pixels and the maximum number of pixels can be quickly and effectively obtained.

At S303, the current angle of view of the photographing device is determined according to the maximum angle of view, the zooming factor, and the pixel ratio.

In some embodiment, determining the current angle of view of the photographing device according to the maximum angle of view, the zooming factor, and the pixel ratio, includes the following processes.

At S3031, the current angle of view of the photographing device can be determined according to a formula described below:

$$\alpha_{FOVr} = 2\ \tan^{-1}\left(nk_{pixel-d}\ \tan\frac{\alpha_{FOV}}{2}\right)$$

where $\alpha_{FOVr}$ denotes the current angle of view of the photographing device, n denotes the zooming factor of the photographing device, $k_{pixel-d}$ denotes the pixel ratio of the number of effective pixels and the maximum number of pixels of the image captured by the photographing device, when the resolution of the photosensitive device of the photographing device is determined, and $\alpha_{FOV}$ denotes the maximum angle of view of the photographing device.

According to the above formula, the maximum angle of view, the zooming factor, and the pixel ratio can be processed to accurately and effectively obtain the current angle of view. As such, accurate and reliable acquisition of the current angle of view can be effectively ensured, and the scope of application and the operation diversity of the gimbal control method can be improved, thereby improving the practicability of the gimbal control method.

Figure 4:
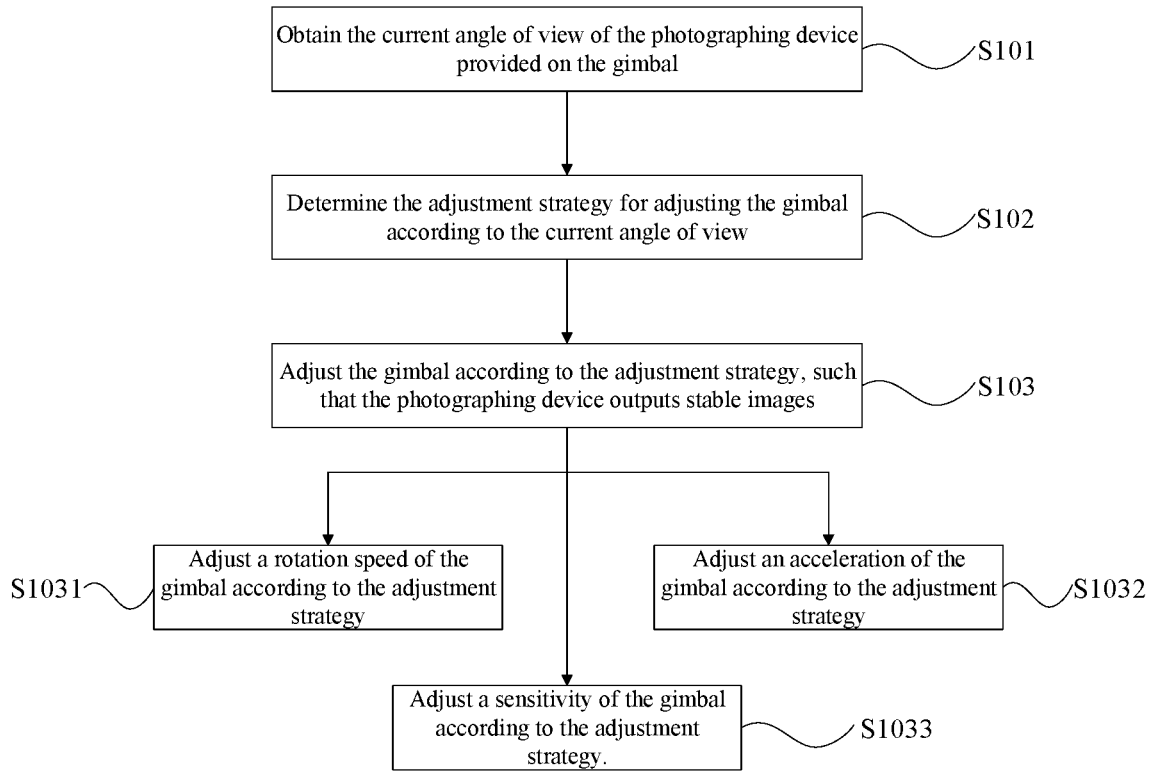
FIG. 4 is a schematic flow chart of another gimbal control method according to an embodiment of the disclosure.

FIG. 4 is a schematic flow chart of another exemplary gimbal control method consistent with the disclosure. As shown in FIG. 4, adjusting the gimbal according to the adjustment strategy includes one or more of the adjustments in processes S1031, S1032, and S1033.

In some embodiments, at S1031, a rotation speed of the gimbal is adjusted according to the adjustment strategy.

When the rotational speed of the gimbal is adjusted according to the adjustment strategy, it indicates that the adjustment strategy includes the target rotation speed of the gimbal, and the gimbal can be controlled to rotate according to the target rotation speed. The rotation of the gimbal has great influence on the stability of the photographing device provided on the gimbal. Therefore, it is necessary to accurately measure the rotation speed of the gimbal and effectively control the rotation operation of the gimbal. For example, the rotation speed of the gimbal can be adjusted according to the angle of view of the photographing device. If the photographing device has a large angle of view, the rotation speed of the gimbal can be larger. In this situation, the photographing device can output stable images within the large angle of view. If the photographing device has a small angle of view, the rotation speed of the gimbal needs to be smaller, which ensures that the photographing device can output stable images within the small angle of view. It is not intended to limit the strategy of adjusting the rotation speed of the gimbal, those skilled in the art can configure a strategy according to a design requirement, as long as the above technical effect can be achieved. The detailed description thereof is omitted here.

In some embodiments, at S1032, an acceleration of the gimbal is adjusted according to the adjustment strategy.

When the acceleration of the gimbal is adjusted according to the adjustment strategy, it indicates that the adjustment strategy includes the target acceleration of the gimbal, and the gimbal can be controlled to rotate according to the target acceleration. For example, the acceleration of the gimbal can be adjusted according to the angle of view of the photographing device. If the photographing device has the large angle of view, the acceleration of the gimbal can be larger. In this situation, the photographing device can output stable images within the large angle of view. If the photographing device has a small angle of view, the acceleration of the gimbal needs to be smaller, which ensures that the photographing device can output stable images within the small angle of view. It is not intended to limit the strategy of adjusting the acceleration of the gimbal, those skilled in the art can configure a strategy according to a design requirement, as long as the above technical effect can be achieved. The detailed description thereof is omitted here.

In some embodiments, at S1033, a sensitivity of the gimbal is adjusted according to the adjustment strategy.

When the sensitivity of the gimbal is adjusted according to the adjustment strategy, it indicates that the adjustment strategy includes the target sensitivity of the gimbal, and the gimbal can be controlled to rotate according to the target sensitivity. When the sensitivity of the gimbal is set as a smaller value, the control accuracy of the gimbal and the photographing device provided on the gimbal can be reduced, thereby making it difficult to accurately and effectively control the gimbal in real time. If the sensitivity of the gimbal is set as a larger value, the jitter can be occurred during the rotation operation of the gimbal, which is harmful for the stable output of the photographing device. Therefore, the sensitivity of the gimbal needs to be set according to the specific actual design requirements. As such, the effective control of the gimbal and the stable image output of the photographing device can be ensured.

In some embodiments, the processes at S1031 to S1033 can be combined. That is, any two of the rotation speed of the gimbal, the rotation acceleration of the gimbal, and the sensitivity of the gimbal can be adjusted at the same time, according to the adjustment strategy. In some other embodiments, all of the rotation speed of the gimbal, the rotation acceleration of the gimbal, and the sensitivity of the gimbal can be adjusted at the same time, according to the adjustment strategy.

According to the above adjustment strategy, the rotation speed of the gimbal, the acceleration of the gimbal, and the sensitivity of the gimbal can be effectively adjusted and controlled, such that the rotation state of the gimbal can be effectively ensured. The stable image output of the photographing device provided on the gimbal can be ensured, and the control accuracy of the gimbal can be improved, thereby ensuring the stability and reliability of the gimbal control method and promoting the market promotion and application.

Figure 5:
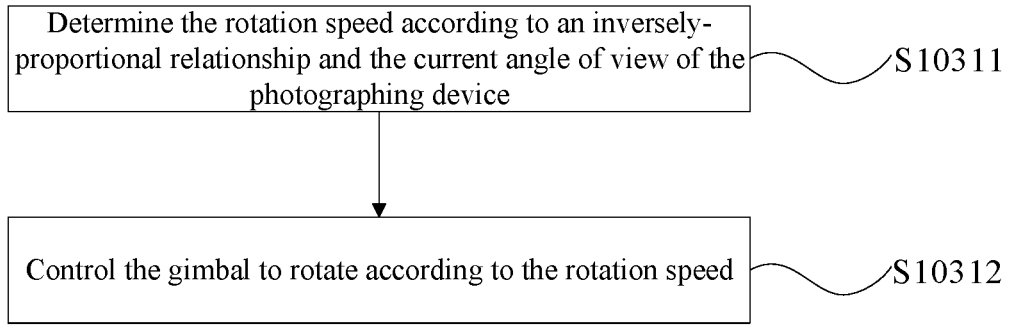
FIG. 5 is a schematic flow chart of another gimbal control method according to an embodiment of the disclosure.

FIG. 5 is a schematic flow chart of another exemplary gimbal control method consistent with the disclosure. It is not intended to limit the implementation processes of adjusting the rotation speed of the gimbal according to the adjustment strategy. Those skilled in the art can configure the implementation processes according to the specific design requirements.

In some embodiments, the photographing device provided on the gimbal can output stable images when the rotation speed is inversely proportional to the current angle of view of the photographing device. Therefore, in some embodiments, as shown in FIG. 5, adjusting the rotation speed of the gimbal according to the adjustment strategy includes the following processes.

At S10311, the rotation speed is determined according to an inversely-proportional relationship and the current angle of view of the photographing device.

It is not intended to limit the inversely-proportional relationship between the rotation speed and the current angle of view of the photographing device. Those skilled in the art can configure the inversely-proportional relationship according to the specific design requirements and effects. For example, the inversely-proportional relationship between the rotation speed and the current angle of view of the photographing device can be set as an inverse ratio of 1:1, an inverse ratio of 1:2, an inverse ratio of 2:1, or the like. The rotation speed can be determined according to the above inversely-proportional relationship and the current angle of view. The rotation speed is the target rotation speed for controlling the gimbal to rotate. If the gimbal is controlled to rotate according to the above rotating speed, the stable image output of the photographing device can be effectively ensured.

At S10312, the gimbal is controlled to rotate according to the rotation speed.

It is not intended to limit the implementation manner of controlling the gimbal to rotate according to the rotation speed. Those skilled in the art can configure an implementation manner according to the specific design requirements. For example, the rotation speed can be inputted into the gimbal control system, such that the control system can control a rotation speed of a motor of the gimbal according to the rotation speed, so as to control the gimbal to rotate according to the rotation speed.

In the embodiment, the inversely-proportional relationship between the rotation speed and the current angle of view of the photographing device can be set, the rotation speed can be determined according to the inversely-proportional relationship and the current angle of view, and the gimbal can be controlled to rotate according to the rotation speed. As such, the stable image output of the photographing device provided on the gimbal can be effectively ensure, and the stability and reliability of the gimbal control method can be further improved.

Figure 6:
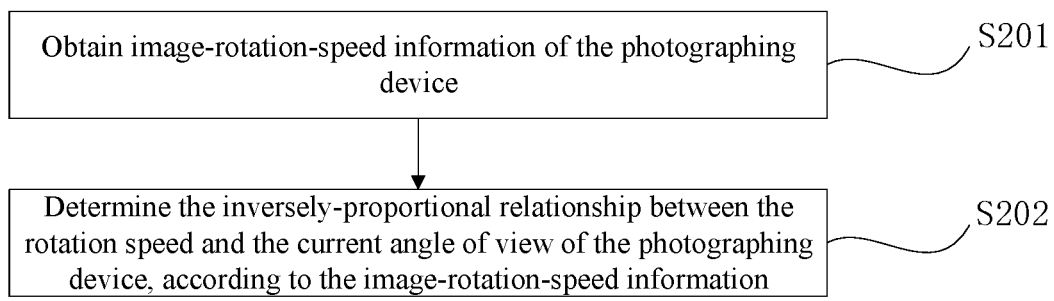
FIG. 6 is a schematic flow chart of another gimbal control method according to an embodiment of the disclosure.

FIG. 6 is a schematic flow chart of another exemplary gimbal control method consistent with the disclosure. The gimbal control method also includes the following processes.

As shown in FIG. 6, at S201, image-rotation-speed information of the photographing device is obtained.

The image-rotation-speed information refers to movement information of the image captured by the photographing device. For example, a marker (i.e., a feature point) can be set in the image captured by the photographing device. An initial position of the marker can be obtained, and after a preset time period, a current position of the marker after being rotated can be obtained. The image-rotation-speed information can be obtained according to the initial position of the marker, the current position of the marker, and the preset time period. It is not intended to limit the manner of obtaining the image-rotation-speed information. Those skilled in the art can utilize other manners of obtaining the image-rotation-speed information, as long as the image-rotation-speed information can be accurately and effectively obtained. The detailed description thereof is omitted here.

At S202, the inversely-proportional relationship between the rotation speed and the current angle of view of the photographing device is determined according to the image-rotation-speed information.

In some embodiments, determining the inversely-proportional relationship between the rotation speed and the current angle of view of the photographing device according to the image-rotation-speed information includes the following processes.

At S2021, the inversely-proportional relationship between the rotation speed and the current angle of view of the photographing device is determined according to a formula $w_g = w_i \alpha_{FOV}$, where $w_i$ denotes the rotation speed of the gimbal, $w_g$ denotes the image-rotation-speed information of the photographing device, and $\alpha_{FOV}$ denotes the current angle of view of the photographing device.

According to the above formula, the inversely-proportional relationship between the rotation speed and the current angle of view can be determined as an inverse ratio of 1:1. That is, when the image-rotation-speed information is determined, if the photographing device has a small current angle of view, the rotation speed of the gimbal can be adjusted to be larger, and if the photographing device has a large current angle of view, the rotation speed of the gimbal can be adjusted to be smaller. When the gimbal is controlled according to the above formula, the speed of determining the inversely-proportional relationship can be effectively increased, and the accuracy and reliability of controlling the gimbal according to the inversely-proportional relationship can be further improved, thereby further improving the practicability of the gimbal control method and promoting the market promotion and application.

Figure 7:
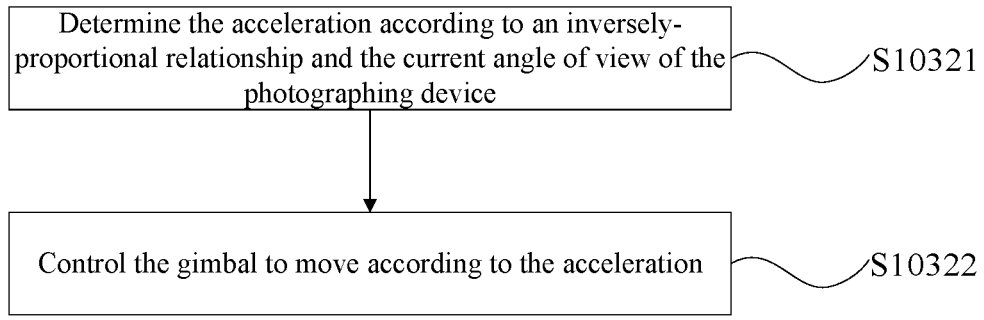
FIG. 7 is a schematic flow chart of another gimbal control method according to an embodiment of the disclosure.

FIG. 7 is a schematic flow chart of another exemplary gimbal control method consistent with the disclosure. It is not intended to limit the implementation processes of adjusting the acceleration of the gimbal according to the adjustment strategy. Those skilled in the art can configure the implementation processes according to the specific design requirements.

In some embodiments, the photographing device provided on the gimbal outputs stable images when the acceleration is inversely proportional to the current angle of view of the photographing device. As shown in FIG. 7, adjusting the acceleration of the gimbal according to the adjustment strategy includes the following processes.

At S10321, the acceleration is determined according to an inversely-proportional relationship and the current angle of view of the photographing device.

It is not intended to limit the inversely-proportional relationship between the acceleration and the current angle of view of the photographing device. Those skilled in the art can set the inversely-proportional relationship according to the specific design requirements and effects. For example, the inversely-proportional relationship between the acceleration and the current angle of view of the photographing device can be set as an inverse ratio of 1:1, an inverse ratio of 1:2, an inverse ratio of 2:1, or the like. The acceleration can be determined according to the above inversely-proportional relationship and the current angle of view. The acceleration is the target acceleration for controlling the gimbal to rotate. If the gimbal is controlled to rotate according to the above acceleration, the stable image output of the photographing device can be effectively ensured.

At S10322, the gimbal is controlled to move according to the acceleration.

It is not intended to limit the implementation manner of controlling the gimbal to move according to the acceleration. Those skilled in the art can configure an implementation manner according to the specific design requirements. For example, the acceleration can be inputted into the gimbal control system, such that the control system can control a running state of the motor of the gimbal according to the acceleration, so as to control the gimbal to move according to the acceleration.

In the embodiment, the inversely-proportional relationship between the acceleration and the current angle of view of the photographing device can be set, the acceleration can be determined according to the inversely-proportional relationship and the current angle of view, and the gimbal can be controlled to rotate according to the acceleration. As such, the stable image output of the photographing device provided on the gimbal can be effectively ensure and the stability and reliability of the gimbal control method can be further improved.

Figure 8:
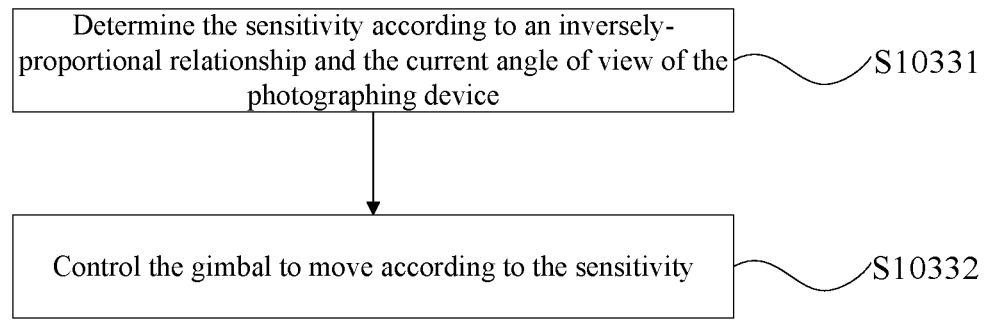
FIG. 8 is a schematic structure diagram of another gimbal control method according to an embodiment of the disclosure.

FIG. 8 is a schematic flow chart of another exemplary gimbal control method consistent with the disclosure. It is not intended to limit the implementation processes of adjusting the sensitivity of the gimbal according to the adjustment strategy. Those skilled in the art can configure the implementation processes according to the specific design requirements.

In some embodiments, the photographing device provided on the gimbal outputs stable images when the sensitivity is inversely proportional to the current angle of view of the photographing device. As shown in FIG. 8, adjusting the sensitivity of the gimbal according to the adjustment strategy includes the following processes.

At S10331, the sensitivity is determined according to an inversely-proportional relationship and the current angle of view of the photographing device.

It is not intended to limit the inversely-proportional relationship between the sensitivity and the current angle of view of the photographing device. Those skilled in the art can set the inversely-proportional relationship according to the specific design requirements and effects. For example, the inversely-proportional relationship between the sensitivity and the current angle of view of the photographing device can be set as an inverse ratio of 1:1, an inverse ratio of 1:2, an inverse ratio of 2:1, or the like. The sensitivity can be determined according to the above inversely-proportional relationship and the current angle of view. The sensitivity is the target sensitivity for controlling the gimbal to rotate. If the gimbal is controlled to rotate according to the above sensitivity, the stable image output of the photographing device can be effectively ensured.

At S10332, the gimbal is controlled to move according to the sensitivity.

It is not intended to limit the implementation manner of controlling the gimbal to move according to the sensitivity. Those skilled in the art can configure an implementation manner according to the specific design requirements. For example, the sensitivity can be inputted into the gimbal control system, such that the control system can control the running state of the motor of the gimbal according to the sensitivity, so as to control the gimbal to move according to the sensitivity.

In the embodiment, the inversely-proportional relationship between the sensitivity and the current angle of view of the photographing device is set, the sensitivity is determined according to the inversely-proportional relationship and the current angle of view, and the gimbal is controlled to move according to the sensitivity. As such, the stable image output of the photographing device provided on the gimbal can be effectively ensure and the stability and reliability of the gimbal control method can be further improved.

In some embodiments, when the gimbal is controlled according to the gimbal control method, the rotation speed of the gimbal, the acceleration of the gimbal, the sensitivity of the gimbal can be controlled separately. In some other embodiments, the rotation speed of the gimbal, the acceleration of the gimbal, the sensitivity of the gimbal can be combined to realize a comprehensive control of the gimbal. It will be appreciated by those skilled in the art that the more control parameters of the gimbal are used, the higher control accuracy of the gimbal can be obtained, such that the stable image output of the photographing device can be ensured.

The executing entity of the gimbal control method can include a gimbal control apparatus. The gimbal control apparatus can include a photographing control circuit for controlling the photographing device and a gimbal control circuit for controlling the gimbal. The photographing control circuit can be communicatively connected to the gimbal control circuit. The photographing control circuit can be configured to read the current angle of view of the photographing device and send the current angle of view of the photographing device to the gimbal control circuit. The gimbal control circuit can be configured to determine the adjustment strategy (including adjustment information of the acceleration of the gimbal, the rotation speed of the gimbal, and the sensitivity of the gimbal) according to the current angle of view, and control the acceleration of the gimbal, the rotation speed of the gimbal, and the sensitivity of the gimbal according to the adjustment strategy, such that the rotation speeds of the photographing device at the current angle of view at different focal lengths can be consistent. In this situation, the photographing device can output stable images. Through adjusting the rotation speeds of the photographing device at the current angle of view at different focal lengths to be consistent, the user can easily obtain the stable images at a small angle of view. In addition, the photographing device can be quickly adjusted. Through obtaining consistent photographing effect of the currents angle of view of the photographing device at different focal lengths, processes of setting, adjusting, and calculation performed by the user can be reduced and the practicability of the gimbal control method can be effectively improved.

In some embodiments, the measurement of the current angle of view can use a method based on a wide-angle collimator. The accurate angles of view of each state can be obtained by gradually adjusting a zoom motor provided inside the lens of the photographing device. In a process of measurement, a scale provided on the lens of the collimator may not be observed by naked eyes due to different focal lengths of the lens to be measured. A magnifying glass having an appropriate focal length can be added as an auxiliary device, such that a personnel performing the measurement can easily observe measurement results. In addition, because the photosensitive device generally has a rectangle structure, the obtained angle of view can include an angle of view in the X-direction and an angle of view in the Y-direction. The X-direction can be set as a length direction of the photosensitive device and the Y-direction can be set as a width direction of the photosensitive device. After obtaining the angle of view in the X-direction and the angle of view in the Y-direction, the angle of view in the X-direction and the angle of view in the Y-direction can be multiplied by corresponding multiple information according to an actual working range of the photosensitive device having a corresponding resolution. For example, if the resolution of the photosensitive device corresponds to an aspect ratio of 4:3 and the resolution of the image captured by photographing device with the lens corresponds to an aspect ratio of 16:9, the angle of view in the X-direction can be similar to the angle of view in the X-direction of the photosensitive device, and the angle of view in the Y-direction can be the angle of view in the Y-direction of the photosensitive device multiplied by 0.75. As another example, for an image having a resolution of corresponding to an aspect ratio of 21:9, the angle of view in the Y-direction can be the angle of view in the Y-direction of the photosensitive device multiplied by 12/21. Generally, the resolution of the photosensitive device provided in the photographing device corresponds to an aspect ratio of 4:3, but a scale of the image, the aspect ratio of the image, may be set as 16:9 or 1:1. In this situation, the image can be cropped. Therefore, the calculated angle of view is generally smaller than the angle of view of the entire sensor.

After data about the angle of view is obtained, the data about angle of view can be stored in the photographing device. The obtained angle of view in the X-direction and the obtained angle of view in the Y-direction are sent to the gimbal control system. If a number of steps of the zoom motor provided in the photographing device can be arbitrary, when the image captured by the photographing device is enlarged, the gimbal control system can reduce the corresponding angle of view according to a multiplication method. For example, the angle of view is a, a height of an object is b, and a distance between the object and the lens is s. As such, b=s×tan(a/2). If the distance between the object and the lens is enlarged twice, tan(a/2) can be reduced twice correspondingly. According to a formula tan(a/2)=2×tan(a1/2), a new angle of view a1 can be obtained, and the gimbal can be controlled according the new angle of view.

When the angle of view is obtained and an adjustment control is performed on the gimbal, the following variable information can be defined.

$$\alpha_{FOV} = \begin{bmatrix} \alpha_{FOV-x} \\ \alpha_{FOV-y} \end{bmatrix}$$

denotes the angle of view of the photographing device when the image is not cropped and zoomed, which includes an angle of view in the X-direction $\alpha_{FOV-x}$ and an angle of view in the Y-direction $\alpha_{FOV-y}$.

$$\alpha_{FOVr} = \begin{bmatrix} \alpha_{FOVr-x} \\ \alpha_{FOVr-y} \end{bmatrix}$$

denotes the angle of view after the image is cropped and zoomed, which includes an angle of view in the X-direction $\alpha_{FOVr-x}$ and an angle of view in the Y-direction $\alpha_{FOVr-y}$.

$l_{focal}$ denotes the focal length of a camera, n denotes a digital zooming factor of the camera, $$l = \begin{bmatrix} l_x \\ l_y \end{bmatrix}$$

denotes a size of the object to be photographed including a length in the X-direction $l_x$ and a length in the Y-direction $l_y$. S denotes a distance between the object to be photographed and a focus of the camera.

$$k_{pixel} = \begin{bmatrix} k_{pixel-x} \\ k_{pixel-y} \end{bmatrix}$$

denotes, in the absence of digital zooming and using video formats having different aspect ratios at a given resolution, a ratio of a number of effective pixels in the image to a maximum number of pixels of the camera that can be achieved at the given resolution, which includes a ratio in the X-direction $k_{pixel-x}$ and a ratio in the Y-direction $k_{pixel-y}$.

Therefore, after digital zoom is performed, $k_{pixel-d}=nk_{pixel-d}$.

$$\omega_g = \begin{bmatrix} \omega_{g-x} \\ \omega_{g-y} \end{bmatrix}$$

denotes the image-rotation-speed that refers to a number of the angle of the view of the image that can be rotated through per unit of time, which includes a rotation speed in the X-direction $\omega_{g-x}$ and a rotation speed in the Y-direction $\omega_{g-y}$.

$$\omega_i = \begin{bmatrix} \omega_{i-X} \\ \omega_{i-Y} \end{bmatrix}$$

denotes the rotation speed of the gimbal including a rotation speed in the X-direction $\omega_{i-X}$ and a rotation speed in the Y-direction $\omega_{i-Y}$.

Because each focal length corresponds to a certain angle of view, the focal length of the lens and the angle of view have the following corresponding relationship according to a pre-calibrated mapping function.

$$\alpha_{FOV} = f_{FOV}(l_{local}) = 2\tan^{-1}\frac{1}{s},$$

where $f_{FOV}(l_{focal})$ denotes the pre-calibrated mapping function between the focal length of the lens of the photographing device and the angle of view.

According to the above formula, $$\frac{l}{s} = \tan\frac{a_{FOV}}{2}$$

can be obtained.

According to another formula $$\alpha_{FOVr} = 2\tan^{-1}\left(k_{pixel-d} \cdot \frac{1}{s}\right),$$

the following functional relationship can be obtained:

$$\alpha_{FOVr} = 2\tan^{-1}k_{pixel-d} \cdot 1/s = 2\tan^{-1}\left(k_{pixel-d} \cdot \tan\frac{\alpha_{FOV}}{2}\right)$$

Therefore, given a certain image-rotation-speed $\omega_g$, the inversely-proportional function of the current angle of view and the image-rotation-speed can be determined as:

$$\omega_g = \omega_i \cdot \alpha_{FOVr} = 2\omega_i \cdot \tan^{-1}\left(nk_{pixel\text{-}d} \cdot \tan\frac{\alpha_{FOV}}{2}\right)$$

According to the above formula, the inversely-proportional relationship between the rotation speed and the current angle of view can be determined as an inverse ratio of 1:1. That is, when the image-rotation-speed information is determined, if the photographing device has a small current angle of view, the rotation speed of the gimbal can be adjusted to be larger, and if the photographing device has a large current angle of view, the rotation speed of the gimbal can be adjusted to be smaller. When the gimbal is controlled according to the above formula, the speed of determining the inversely-proportional relationship can be effectively increased, and the accuracy and reliability of controlling the gimbal according to the inversely-proportional relationship can be further improved, thereby further improving the practicability of the gimbal control method and promoting the market promotion and application.

Figure 9:
FIG. 9 is a schematic structural diagram of a gimbal control apparatus according to an embodiment of the disclosure.

FIG. 9 is a schematic structural diagram of an exemplary gimbal control apparatus consistent with the disclosure. The gimbal control apparatus is configured to implement the gimbal control method to realize an effective control of the gimbal and the photographing device provided on the gimbal. As shown in FIG. 9, the gimbal control apparatus includes a data collector 1 and a data processor 2 communicatively connected to the data collector 1.

The data collector 1, also referred to as a data collecting device, is configured to obtain the current angle of view of the photographing device provided on the gimbal.

The data processor 2 is configured to determine the adjustment strategy for adjusting the gimbal according to the current angle of view and adjust the gimbal according to the adjustment strategy, such that the photographing device outputs stable images.

It is not intended to limit structures of the data collector 1 and the data processor 2. Those skilled in the art can configure the structures according to the specific design requirements, as long as the above implementation processes can be realized. The detailed description thereof is omitted here. In addition, the data collector 1 and the data processor 2 can be wirelessly connected via Bluetooth or WiFi, or can be wired to connect through a data cable, as long as the data communication between the data collector 1 and the data processor 2 can be realized. The detailed description thereof is omitted here. Furthermore, it is not intended to limit locations of the data collector 1 and the data processor 2. For example, the data collector 1 can be provided inside the photographing device, the data processor 2 can be provided inside the gimbal control system, or the data collector 1 and the data processor 2 can both be provided inside the gimbal control system, the photographing device, or the like. Those skilled in the art can configure the data collector 1 and the data processor 2 according to the above-described function effects. The detailed description thereof is omitted here.

The implementation processes and effects of the method implemented by the data collector 1 and the data processor 2 are similar to the implementation processes and effects at S101 to S103. The detailed description thereof is omitted here.

In the embodiment, the data collector 1 can obtain the current angle of view of the photographing device, and the data processor 2 can determine the adjustment strategy for adjusting the gimbal according to the current angle of view and adjust the gimbal according to the adjustment strategy. As such, the stable image output of the photographing device can be effectively ensured. Therefore, the problem that the stable image output of the photographing device can be affected, which is harmful for the collection and monitoring of data information, can be overcome. At the same time, the accuracy of the image captured by the photographing device can be ensured, thereby improving the practicability of the gimbal control apparatus and promoting the market promotion and application.

In some embodiments, the data collector 1 and the data processor 2 can be processors or controllers that are integrated together.

In some embodiments, the data collector 1 is also configured to, before obtaining the current angle of view of the photographing device provided on the gimbal, obtain the diagonal length of the photosensitive device provided in the photographing device and the equivalent focal length of the photographing device, and determine the current angle of view of the photographing device according to the diagonal length and the equivalent focal length.

In some embodiments, the data collector 1 is configured to determine the current angle of view of the photographing device according to the formula $$\tan(w) = \frac{y'}{2f'},$$

where y' denotes the diagonal length of the photosensitive device provided in the photographing device, f' denotes the equivalent focal length of the photographing device, w denotes the current angle of view of the photographing device.

The implementation processes and effects of the method implemented by the data collector 1 are similar to the implementation processes and effects at S001, S002, and S0021. The detailed description thereof is omitted here.

In the embodiment, the data collector 1 can accurately and effectively obtain the current angle of view using the above formula to compute the diagonal length and the equivalent focal length. The accuracy and reliability of the current angle of view can be effectively ensured, thereby improving the accuracy and reliability of controlling the gimbal using the gimbal control apparatus, and promoting the market promotion and application.

In some embodiments, the data collector 1 is also configured to obtain the maximum angle of view of the photographing device and the zooming factor of the photographing device, obtain the pixel ratio of the number of effective pixels and the maximum number of pixels of the image captured by the photographing device, and determine the current angle of view of the photographing device according to the maximum angle of view, the zooming factor, and the pixel ratio.

In some embodiments, the data collector 1 is also configured to determine the current angle of view of the photographing device according to the formula:

$$\alpha_{FOVr} = 2\tan^{-1}\left(nk_{pixel\text{-}d}\tan\frac{\alpha_{FOV}}{2}\right)$$

where $\alpha_{FOVr}$ denotes the current angle of view of the photographing device, n denotes the zooming factor of the photographing device, $k_{pixel-d}$ denotes the pixel ratio of the number of effective pixels and the maximum number of pixels of the image captured by the photographing device, when the resolution of the photosensitive device of the photographing device is determined, and $\alpha_{FOV}$ denotes the maximum angle of view of the photographing device.

The implementation processes and effects of the method implemented by the data collector 1 are similar to the implementation processes and effects at S301 to S303 and S3031. The detailed description thereof is omitted here.

According to the above formula, the data collector 1 can process the maximum angle of view, the zooming factor, and the pixel ratio to accurately and effectively obtain the current angle of view. As such, accurate and reliable acquisition of the current angle of view can be effectively ensured, and the scope of application and the operation diversity of the gimbal control apparatus can be improved, thereby improving the practicability of the gimbal control method.

In some embodiments, the data processor 2 is configured to adjust the rotation speed of the gimbal according to the adjustment strategy. In some embodiments, the data processor 2 is configured to adjust the acceleration of the gimbal according to the adjustment strategy. In some embodiments, the data processor 2 is configured to adjust the sensitivity of the gimbal according to the adjustment strategy. In some embodiments, the data processor 2 is configured to adjust any two of the rotation speed of the gimbal, the acceleration of the gimbal, and the sensitivity of the gimbal according to the adjustment strategy, or all of the rotation speed of the gimbal, the acceleration of the gimbal, and the sensitivity of the gimbal according to the adjustment strategy.

The implementation processes and effects of the method implemented by the data processor 2 are similar to the implementation processes and effects at S1031 to S1033. The detailed description thereof is omitted here.

According to the above adjustment strategy, the data processor 2 can effectively adjust and control the rotation speed of the gimbal, the acceleration of the gimbal, and the sensitivity of the gimbal, such that the rotation state of the gimbal can be effectively ensured. The stable image output of the photographing device provided on the gimbal can be ensured, and the control accuracy of the gimbal can be improved, thereby ensuring the stability and reliability of the gimbal control apparatus and promoting the market promotion and application.

In some embodiments, the data processor 2 can control the photographing device provided on the gimbal to output stable images when the rotation speed is inversely proportional to the current angle of view of the photographing device.

In some embodiments, the data processor 2 is configured to determine the rotation speed according to the inversely-proportional relationship and the current angle of view of the photographing device, and control the gimbal to rotate according to the rotation speed.

The implementation processes and effects of the method implemented by the data processor 2 are similar to the implementation processes and effects at S10311 and S10312. The detailed description thereof is omitted here.

In the embodiment, the data processor 2 can set the inversely-proportional relationship between the rotation speed and the current angle of view of the photographing device, determine the rotation speed according to the inversely-proportional relationship and the current angle of view, and control the gimbal to rotate according to the rotation speed. As such, the stable image output of the photographing device provided on the gimbal can be effectively ensure and the stability and reliability of the gimbal control apparatus can be further improved.

In some embodiments, the data collector 1 is also configured to obtain the image-rotation-speed information of the photographing device. The data processor 2 is also configured to determine the inversely-proportional relationship between the rotation speed and the current angle of view of the photographing device according to the image-rotation-speed information.

In some embodiments, the data processor 2 is also configured to determine the inversely-proportional relationship between the rotation speed and the current angle of view of the photographing device according to the formula $w_g = w_i \alpha_{FOVr}$, where $w_i$ denotes the rotation speed of the gimbal, $w_g$ denotes the image-rotation-speed information of the photographing device, and $\alpha_{FOVr}$ denotes the current angle of view of the photographing device.

The implementation processes and effects of the method implemented by the data collector 1 and the data processor 2 are similar to the implementation processes and effects at S201, S202, and S2021. The detailed description thereof is omitted here.

When the data processor 2 controls the gimbal according to the above formula, the speed of determining the inversely-proportional relationship can be effectively increased, and the accuracy and reliability of controlling the gimbal according to the inversely-proportional relationship can be further improved, thereby further improving the practicability of the gimbal control apparatus and promoting the market promotion and application.

In some embodiments, the photographing device provided on the gimbal outputs stable images when the acceleration is inversely proportional to the current angle of view of the photographing device.

In some embodiments, the data processor 2 is configured to determine the acceleration according to the inversely-proportional relationship and the current angle of view of the photographing device, and control the gimbal to move according to the acceleration.

The implementation processes and effects of the method implemented by the data processor 2 are similar to the implementation processes and effects at S10321 to S10322. The detailed description thereof is omitted here.

In the embodiment, the data processor 2 can set the inversely-proportional relationship between the acceleration and the current angle of view of the photographing device, determine the acceleration according to the inversely-proportional relationship and the current angle of view, and control the gimbal to rotate according to the acceleration. As such, the stable image output of the photographing device provided on the gimbal can be effectively ensure and the stability and reliability of the gimbal control apparatus can be further improved.

In some embodiments, the photographing device provided on the gimbal outputs stable images when the sensitivity is inversely proportional to the current angle of view of the photographing device.

In some embodiments, the data processor 2 is configured to determine the sensitivity according to the inversely-proportional relationship and the current angle of view of the photographing device, and control the gimbal to move according to the sensitivity.

The implementation processes and effects of the method implemented by the data processor 2 are similar to the implementation processes and effects at S10331 to S10332. The detailed description thereof is omitted here.

In the embodiment, the data processor 2 can set the inversely-proportional relationship between the sensitivity and the current angle of view of the photographing device, determine the sensitivity according to the inversely-proportional relationship and the current angle of view, and control the gimbal to move according to the sensitivity. As such, the stable image output of the photographing device provided on the gimbal can be effectively ensure and the stability and reliability of the gimbal control apparatus can be further improved.

In some embodiments, a storage medium consistent with the disclosure can include a hard disk, a USB flash drive, an optical disk, or another device having a storage space. A program code can be stored in the storage medium. When the program code is run, the gimbal control method will be executed. The method includes obtaining the current angle of view of the photographing device provided on the gimbal, determining the adjustment strategy for adjusting the gimbal according to the current angle of view, and adjusting the gimbal according to the adjustment strategy, such that the photographing device outputs stable images.

The implementation processes and effects of the method implemented by running the program code stored in the storage medium are similar to the implementation processes and effects at S101 to S103. The detailed description thereof is omitted here.

In the embodiment, through running the program code stored in the storage medium, the current angle of view of the photographing device can be obtained, the adjustment strategy can determined for adjusting the gimbal according to the current angle of view, and the gimbal can be adjusted according to the adjustment strategy. As such, the stable image output of the photographing device can be effectively ensured. Therefore, the problem that the stable image output of the photographing device can be affected, which is harmful for the collection and monitoring of data information, can be overcome. At the same time, the accuracy of the image captured by the photographing device can be ensured, thereby improving the practicability of the storage medium and promoting the market promotion and application.

In some embodiments, when the program code stored in the storage medium is run, the gimbal control method being executed can also include: before obtaining the current angle of view of the photographing device provided on the gimbal, obtaining the diagonal length of the photosensitive device provided in the photographing device and the equivalent focal length of the photographing device, and determining the current angle of view of the photographing device according to the diagonal length and the equivalent focal length.

In some embodiments, the method can also include determining the current angle of view of the photographing device according to the formula $$\tan(w) = \frac{y'}{2f'},$$

where y' denotes the diagonal length of the photosensitive device provided in the photographing device, f' denotes the equivalent focal length of the photographing device, w denotes the current angle of view of the photographing device.

The implementation processes and effects of the method implemented by running the program code stored in the storage medium are similar to the implementation processes and effects at S001, S002, and S0021. The detailed description thereof is omitted here.

In the embodiment, the current angle of view can be accurately and effectively obtained using the above formula to compute the diagonal length and the equivalent focal length. The accuracy and reliability of the current angle of view can be effectively ensured, thereby improving the accuracy and reliability of controlling the gimbal through running the program code stored in the storage medium, and promoting the market promotion and application.

In some embodiments, when the program code stored in the storage medium is run, the gimbal control method being executed can also include: obtaining the maximum angle of view of the photographing device and the zooming factor of the photographing device, obtaining the pixel ratio of the number of effective pixels and the maximum number of pixels of the image captured by the photographing device, and determining the current angle of view of the photographing device according to the maximum angle of view, the zooming factor, and the pixel ratio. In some embodiments, the method can also include determining the current angle of view of the photographing device according to the formula:

$$\alpha_{FOVr} = 2\tan^{-1}\left(nk_{pixel-d}\tan\frac{\alpha_{FOV}}{2}\right)$$

where $\alpha_{FOVr}$ denotes the current angle of view of the photographing device, n denotes the zooming factor of the photographing device, $k_{pixel-d}$ denotes the pixel ratio of the number of effective pixels and the maximum number of pixels of the image captured by the photographing device, when the resolution of the photosensitive device of the photographing device is determined, and $\alpha_{FOV}$ denotes the maximum angle of view of the photographing device.

The implementation processes and effects of the method implemented by running the program code stored in the storage medium are similar to the implementation processes and effects at S301 to S303, and S3031. The detailed description thereof is omitted here.

According to the above formula, the maximum angle of view, the zooming factor, and the pixel ratio can be processed to accurately and effectively obtain the current angle of view. As such, accurate and reliable acquisition of the current angle of view can be effectively ensured, and the scope of application and the operation diversity of the storage medium can be improved, thereby improving the practicability of the storage medium.

In some embodiments, when the program code stored in the storage medium is run, the gimbal control method being executed can also include: adjusting the rotation speed of the gimbal according to the adjustment strategy and/or, adjusting the acceleration of the gimbal according to the adjustment strategy and/or, adjusting the sensitivity of the gimbal according to the adjustment strategy.

The implementation processes and effects of the method implemented by running the program code stored in the storage medium are similar to the implementation processes and effects at S1031 to S1033. The detailed description thereof is omitted here.

According to the above adjustment strategy, the rotation speed of the gimbal, the acceleration of the gimbal, and the sensitivity of the gimbal can be effectively adjusted and controlled, such that the rotation state of the gimbal can be effectively ensured. The stable image output of the photographing device provided on the gimbal can be ensured, and the control accuracy of the gimbal can be improved, thereby ensuring the stability and reliability of usage of the storage medium and promoting the market promotion and application.

In some embodiments, when the program code stored in the storage medium is run, the gimbal control method being executed can also include: determining the rotation speed according to the inversely-proportional relationship and the current angle of view of the photographing device, and controlling the gimbal to rotate according to the rotation speed.

The implementation processes and effects of the method implemented by running the program code stored in the storage medium are similar to the implementation processes and effects at S10311 and S10312. The detailed description thereof is omitted here.

In the embodiment, the inversely-proportional relationship between the rotation speed and the current angle of view of the photographing device can be set, the rotation speed can be determined according to the inversely-proportional relationship and the current angle of view, and the gimbal can be controlled to rotate according to the rotation speed. As such, the stable image output of the photographing device provided on the gimbal can be effectively ensure and the stability and reliability of the usage of the storage medium can be further improved.

In some embodiments, when the program code stored in the storage medium is run, the gimbal control method being executed can also include: obtaining the image-rotation-speed information of the photographing device, and determining the inversely-proportional relationship between the rotation speed and the current angle of view of the photographing device according to the image-rotation-speed information. In some embodiments, the method can further include determining the inversely-proportional relationship between the rotation speed and the current angle of view of the photographing device according to the formula $w_g = w_t \alpha_{FOV}$, where $w_t$ denotes the rotation speed of the gimbal, $w_g$ denotes the image-rotation-speed information of the photographing device, and $\alpha_{FOV}$ denotes the current angle of view of the photographing device.

The implementation processes and effects of the method implemented by running the program code stored in the storage medium are similar to the implementation processes and effects at S201, S202, and S2021. The detailed description thereof is omitted here.

When the gimbal is controlled according to the above formula, the speed of determining the inversely-proportional relationship can be effectively increased, and the accuracy and reliability of controlling the gimbal according to the inversely-proportional relationship can be further improved, thereby further improving the practicability of the storage medium and promoting the market promotion and application.

In some embodiments, when the program code stored in the storage medium is run, the gimbal control method being executed can also include: determining the acceleration according to the inversely-proportional relationship and the current angle of view of the photographing device, and controlling the gimbal to move according to the acceleration.

The implementation processes and effects of the method implemented by running the program code stored in the storage medium are similar to the implementation processes and effects at S10321 and S10322. The detailed description thereof is omitted here.

In the embodiment, the inversely-proportional relationship between the acceleration and the current angle of view of the photographing device can be set, the acceleration can be determined according to the inversely-proportional relationship and the current angle of view, and the gimbal can be controlled to rotate according to the acceleration. As such, the stable image output of the photographing device provided on the gimbal can be effectively ensure and the stability and reliability of the usage of the storage medium can be further improved.

In some embodiments, when the program code stored in the storage medium is run, the gimbal control method being executed can also include: determining the sensitivity according to the inversely-proportional relationship and the current angle of view of the photographing device, and controlling the gimbal to move according to the sensitivity.

The implementation processes and effects of the method implemented by running the program code stored in the storage medium are similar to the implementation processes and effects at S10331 and S10332. The detailed description thereof is omitted here.

In the embodiment, the inversely-proportional relationship between the sensitivity and the current angle of view of the photographing device can be set, the sensitivity according to the inversely-proportional relationship and the current angle of view can be determined, and the gimbal can be controlled to move according to the sensitivity. As such, the stable image output of the photographing device provided on the gimbal can be effectively ensure and the stability and reliability of the usage of the storage medium can be further improved.

In some embodiments, an unmanned vehicle consistent with the disclosure can include the gimbal and the photographing device provided on the gimbal. In some embodiments, the unmanned vehicle can also include the gimbal control apparatus described above.

It is not intended to limit the type of the unmanned vehicle. Those skilled in the art can choose the type of the unmanned vehicle according to the specific design requirements. For example, the unmanned vehicle can include an unmanned aerial vehicle (UAV), a driverless car, a driverless ship, or the like.

Through providing the gimbal control apparatus on the unmanned vehicle, the gimbal control apparatus can control the gimbal according to the adjustment strategy, such that the stable image output of the photographing device can be effectively ensured. Therefore, the problem that the stable image output of the photographing device can be affected, which is harmful for the collection and monitoring of data information, can be overcome. At the same time, the accuracy of the image captured by the photographing device can be ensured, thereby improving the practicability of the unmanned vehicle and the market competitiveness of the unmanned vehicle, and promoting the market promotion and application.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the exemplary methods described above. The storage medium can be any medium that can store program codes, for example, a USB disk, a mobile hard disk, a read-only memory (ROM), a random access memory (RAM), a magnetic disk, or an optical disk.

It is intended that the specification and examples be considered as exemplary only and not to limit the scope of the disclosure. Those skilled in the art will be appreciated that any modification or equivalents to the disclosed embodiments are intended to be encompassed within the scope of the present disclosure.

What is claimed is:

1. A method for controlling a gimbal comprising:
    obtaining a current angle of view of a photographing device provided on the gimbal;
    determining, according to the current angle of view, an adjustment strategy for adjusting the gimbal, the adjustment strategy allowing the photographing device to output stable images; and
    adjusting at least one of an acceleration or a sensitivity of the gimbal according to the adjustment strategy.

2. The method of claim 1, wherein:
    the acceleration and the current angle of view of the photographing device have an inversely-proportional relationship; and
    adjusting the at least one of the acceleration or the sensitivity of the gimbal comprises adjusting the acceleration according to the inversely-proportional relationship and the current angle of view of the photographing device.

3. The method of claim 1, wherein:
    the acceleration and the current angle of view of the photographing device have a directly-proportional relationship; and
    adjusting the at least one of the acceleration or the sensitivity of the gimbal comprises adjusting the acceleration according to the directly-proportional relationship and the current angle of view of the photographing device.

4. The method of claim 1, wherein:
    the sensitivity and the current angle of view of the photographing device have an inversely-proportional relationship; and
    adjusting the at least one of the acceleration or the sensitivity of the gimbal comprises adjusting the sensitivity according to the inversely-proportional relationship and the current angle of view of the photographing device.

5. The method of claim 1, wherein:
    the sensitivity and the current angle of view of the photographing device have a directly-proportional relationship; and
    adjusting the at least one of the acceleration or the sensitivity of the gimbal comprises adjusting the sensitivity according to the directly-proportional relationship and the current angle of view of the photographing device.

6. The method of claim 1, further comprising:
    adjusting a rotation speed of the gimbal according to the adjustment strategy.

7. The method of claim 6, wherein:
    the rotation speed and the current angle of view of the photographing device have an inversely-proportional relationship; and
    adjusting the rotation speed comprises adjusting the rotation speed according to the inversely-proportional relationship and the current angle of view of the photographing device.

8. The method of claim 7, further comprising:
    obtaining image-rotation-speed information of the photographing device; and
    determining the inversely-proportional relationship between the rotation speed and the current angle of view of the photographing device according to the image-rotation-speed information.

9. The method of claim 6, wherein:
    the rotation speed and the current angle of view of the photographing device have a directly-proportional relationship; and
    adjusting the rotation speed comprises adjusting the rotation speed according to the directly-proportional relationship and the current angle of view of the photographing device.

10. The method of claim 1, wherein obtaining the current angle of view of the photographing device comprises determining the current angle of view of the photographing device according to:
    a diagonal length of a photosensitive device of the photographing device and an equivalent focal length of the photographing device; or
    a maximum angle of view of the photographing device, a zooming factor of the photographing device, and a pixel ratio of a number of effective pixels and a maximum number of pixels of an image captured by the photographing device.

11. An apparatus for controlling a gimbal comprising:
    a data collector configured to obtain a current angle of view of a photographing device provided on the gimbal; and
    a data processor coupled to the data collector and configured to:
        determine, according to the current angle of view, an adjustment strategy for adjusting the gimbal, the adjustment strategy allowing the photographing device to output stable images; and
        adjust at least one of an acceleration or a sensitivity of the gimbal according to the adjustment strategy.

12. The apparatus of claim 11, wherein:
    the acceleration and the current angle of view of the photographing device have an inversely-proportional relationship; and the data processor is further configured to adjust the acceleration according to the inversely-proportional relationship and the current angle of view of the photographing device.

13. The apparatus of claim 11, wherein:
the acceleration and the current angle of view of the photographing device have a directly-proportional relationship; and
the data processor is further configured to adjust the acceleration according to the directly-proportional relationship and the current angle of view of the photographing device.

14. The apparatus of claim 11, wherein:
the sensitivity and the current angle of view of the photographing device have an inversely-proportional relationship; and
the data processor is further configured to adjust the sensitivity according to the inversely-proportional relationship and the current angle of view of the photographing device.

15. The apparatus of claim 11, wherein:
the sensitivity and the current angle of view of the photographing device have a directly-proportional relationship; and
the data processor is further configured to adjust the sensitivity according to the directly-proportional relationship and the current angle of view of the photographing device.

16. The apparatus of claim 11, the data processor is further configured to adjust a rotation speed of the gimbal according to the adjustment strategy.

17. The apparatus of claim 16, wherein:
the rotation speed and the current angle of view of the photographing device have an inversely-proportional relationship; and
the data processor is further configured to adjust the rotation speed according to the inversely-proportional relationship and the current angle of view of the photographing device.

18. The apparatus of claim 17, wherein the processor is further configured to:
obtain image-rotation-speed information of the photographing device; and
determine the inversely-proportional relationship between the rotation speed and the current angle of view of the photographing device according to the image-rotation-speed information.

19. The apparatus of claim 16, wherein:
the rotation speed and the current angle of view of the photographing device have a directly-proportional relationship; and
the data processor is further configured to adjust the rotation speed according to the directly-proportional relationship and the current angle of view of the photographing device.

20. The apparatus of claim 11, wherein the processor is further configured to determine the current angle of view of the photographing device according to:
a diagonal length of a photosensitive device of the photographing device and an equivalent focal length of the photographing device; or
a maximum angle of view of the photographing device, a zooming factor of the photographing device, and a pixel ratio of a number of effective pixels and a maximum number of pixels of an image captured by the photographing device.

* * * * *